US008523660B2

(12) United States Patent
Jacob

(10) Patent No.: US 8,523,660 B2
(45) Date of Patent: *Sep. 3, 2013

(54) METHOD AND APPARATUS FOR ADJUSTMENT OF GAME PARAMETERS BASED ON MEASUREMENT OF USER PERFORMANCE

(75) Inventor: Mark Lester Jacob, San Diego, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/183,297

(22) Filed: Jul. 14, 2011

(65) Prior Publication Data

US 2011/0269528 A1   Nov. 3, 2011

Related U.S. Application Data

(62) Division of application No. 12/105,174, filed on Apr. 17, 2008.

(60) Provisional application No. 60/915,175, filed on May 1, 2007, provisional application No. 60/914,235, filed on Apr. 26, 2007.

(51) Int. Cl.
*A63F 9/24* (2006.01)
(52) U.S. Cl.
USPC ............ 463/23; 463/6; 463/7; 463/9; 463/36; 463/39; 463/40; 463/41; 463/42; 463/43

(58) Field of Classification Search
USPC .............................. 463/6, 7, 9, 23, 36, 39–43
See application file for complete search history.

(56) References Cited

U.S. PATENT DOCUMENTS

| 4,657,247 | A | * | 4/1987 | Okada ............................ 463/23 |
| 4,679,789 | A | * | 7/1987 | Okada ............................ 463/23 |
| 5,720,663 | A | | 2/1998 | Nakatani et al. |
| 6,545,661 | B1 | | 4/2003 | Goschy et al. |
| 2002/0137566 | A1 | | 9/2002 | Tomizawa et al. |
| 2005/0014542 | A1 | | 1/2005 | Ueshima |
| 2006/0281535 | A1 | * | 12/2006 | Bogan ............................ 463/23 |
| 2007/0082729 | A1 | | 4/2007 | Letovsky |
| 2008/0194337 | A1 | | 8/2008 | Hensel |
| 2008/0254898 | A1 | * | 10/2008 | Endo ............................. 463/43 |
| 2008/0266250 | A1 | | 10/2008 | Jacob |
| 2008/0268943 | A1 | | 10/2008 | Jacob |

OTHER PUBLICATIONS

U.S. Patent & Trademark Office, Office Action issued in U.S. Appl. No. 12/105,174, mailed Apr. 6, 2011, 6 pages.

(Continued)

*Primary Examiner* — Sunit Pandya
(74) *Attorney, Agent, or Firm* — Fitch, Even, Tabin & Flannery LLP

(57) ABSTRACT

Methods, apparatuses, and techniques for adjustment of game parameters based on users' performance are described. During play of a game a user's performance is monitored. It is then determined if the player's performance is within a desired range of performance, and game parameters are adjusted if the user's performance is outside the desired range. In a multi-player game, parameters can be adjusted differently for each of the players to make the overall game play more competitive.

10 Claims, 5 Drawing Sheets

(56) References Cited

OTHER PUBLICATIONS

Riverdeep Interactive Learning Limited, Mavis Beacon Teaches Typing, Enhanced Educator Version User's Guide, Version 15, 2001-2002, 92 pages.
U.S. Patent & Trademark Office, Office Action issued in U.S. Appl. No. 12/105,177, mailed Jun. 1, 2012, 21 pages.
USPTO; Office Action issued in U.S. Appl. No. 12/105,177; mailed May 26, 2011; 10 pages.
USPTO; Office Action issued in U.S. Appl. No. 12/105,174; mailed Jul. 15, 2011; 11 pages.
USPTO; Office Action issued in U.S. Appl. No. 12/105,177; mailed Oct. 18, 2011; 10 pages.
U.S. Patent & Trademark Office, Office Action issued in U.S. Appl. No. 12/105,174, mailed Dec. 30, 2011, 9 pages.
U.S. Patent & Trademark Office, Office Action issued in U.S. Appl. No. 12/105,174, mailed Jul. 5, 2012, 9 pages.
U.S. Patent and Trademark Office, Office Action issued in U.S. Appl. No. 12/105,174, mailed Nov. 29, 2012, 11 pages.
U.S. Patent and Trademark Office, Notice of Allowance and Fees Due issued in U.S. Appl. No. 12/105,177, mailed Mar. 4, 2013, 9 pages.

* cited by examiner

METHOD AND APPARATUS FOR ADJUSTMENT OF GAME PARAMETERS BASED ON MEASUREMENT OF USER PERFORMANCE

CROSS-REFERENCE TO RELATED APPLICATIONS

This application is a divisional U.S. application Ser. No. 12/105,174, filed Apr. 17, 2008, entitled "METHOD AND APPARATUS FOR ADJUSTMENT OF GAME PARAMETERS BASED ON MEASUREMENT OF USER PERFORMANCE" which claims the benefit of both U.S. Provisional Patent Application No. 60/914,235, filed Apr. 26, 2007, entitled "METHOD AND APPARATUS FOR ADJUSTMENT OF GAME PARAMETERS BASED ON MEASUREMENT OF USER PERFORMANCE," and U.S. Provisional Patent Application No. 60/915,175, filed May 1, 2007, entitled "METHOD AND APPARATUS FOR DYNAMICALLY ADJUSTING GAME OR OTHER SIMULATION DIFFICULTY," the entire disclosures of which are all hereby fully incorporated herein by reference in their entireties.

This application is related to U.S. patent application Ser. No. 12/105,177, filed on the same date as this application, entitled "METHOD AND APPARATUS FOR DYNAMICALLY ADJUSTING GAME OR OTHER SIMULATION DIFFICULTY," the entire disclosure of which is hereby fully incorporated herein by reference in its entirety.

BACKGROUND

1. Field of the Invention

The present invention relates to adjustment of game parameters, and more specifically, to adjustment of game parameters based on a user's performance.

2. Background

Computer entertainment game systems and gaming technology have advanced over the years from the simple games such as Pong® and Tetris® to very complex shooter and sports games that have high speed, high resolution graphics and can be played in a multi-player environment. Increased sophistication of features have increased players' interest in the games as well as increasing the difficulty of playing the games. In addition, many games now have multi-player options which enable players from all over the globe to participate in a single-game environment using one or more computers interconnected by an online network such as the Internet. In this online environment players have access to large numbers and wide ranges of opponents of varying skill levels. Interacting with other players can increase a player's interest in playing the game.

Because of the widespread use of computer games, the expertise of the players playing the games can vary greatly. For example, the player can be a novice, only playing the game or a game system for the first time, up to very experienced players who have acquired great skill in the game. While a more difficult game may be enjoyable to the advanced experienced player, it can become frustrating to the novice who may have difficulty navigating the game environment. In addition, in multi-player games if the experienced player is matched against the novice, it can be frustrating for the novice who would have difficulty competing against the experienced player, and it can also be frustrating for the experienced player facing a lack of competition from the novice. Thus, there is a need to improve the gaming environment for players of all skill levels.

SUMMARY

One embodiment provides a method of adjusting game parameters, the method comprising: receiving statistics about typical player interaction with a game; monitoring a user's performance while the user is playing the game; determining if the user's performance is within a desired range of performance; and dynamically adjusting game parameters while the user is playing the game if the user's performance is outside the desired range.

Another embodiment provides a method of adjusting game parameters in a multi-user game, the method comprising: receiving profiles of two or more users in the multi-user game; adjusting game options for the respective users based upon their respective profiles; monitoring the users' relative performance in playing the multi-user game; determining if the users' relative performance is within a desired range of performance; and dynamically adjusting game parameters for one or more of the users while the users are playing the multi-user game if the relative performance of the users is outside the desired range.

Another embodiment provides a storage medium storing a computer program executable by a processor based system, the computer program causing the processor based system to execute steps comprising: receiving statistics about typical player interaction with a game; monitoring a user's performance while the user is playing the game; determining if the user's performance is within a desired range of performance; and dynamically adjusting game parameters while the user is playing the game if the user's performance is outside the desired range.

Another embodiment provides an apparatus for use with adjusting game parameters, comprising: an input device for use by a user to interact with a game; and a processor based system configured to receive statistics about typical player interaction with the game, monitor the user's performance while the user is playing the game, determine if the user's performance is within a desired range of performance, and dynamically adjust game parameters while the user is playing the game if the user's performance is outside the desired range.

Another embodiment provides a storage medium storing a computer program executable by a processor based system, the computer program causing the processor based system to execute steps comprising: receiving profiles of two or more users in a multi-user game; adjusting game options for the respective users based upon their respective profiles; monitoring the users' relative performance in playing the multi-user game; determining if the users' relative performance is within a desired range of performance; and dynamically adjusting game parameters for one or more of the users while the users are playing the multi-user game if the relative performance of the users is outside the desired range.

Other features and advantages of the present invention will become more readily apparent to those of ordinary skill in the art after reviewing the following detailed description and accompanying drawings.

DETAILED DESCRIPTION

Figure 1:
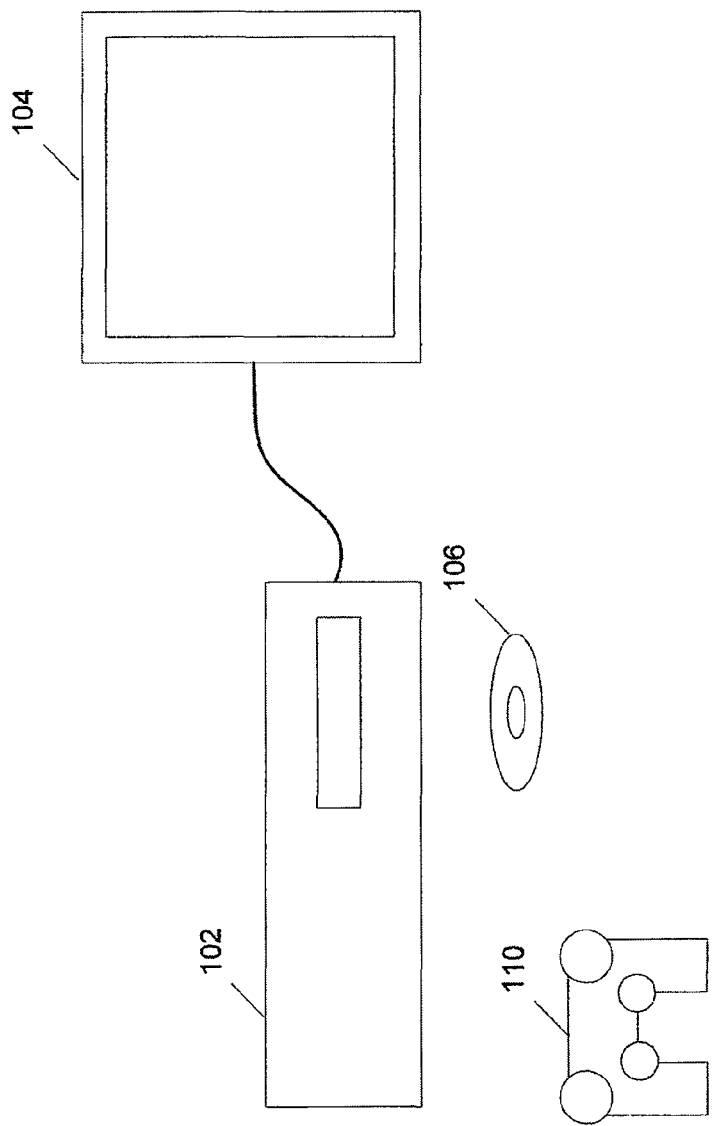
FIG. 1 is a block diagram illustrating a system that operates in accordance with an embodiment of the present invention.

After reading the following description it will become apparent to one skilled in the art how to implement the invention in various alternative embodiments and alternative applications. However, although various embodiments of the present invention will be described herein, it is to be understood that these embodiments are presented by way of example only, and not limitations. As such, this detailed description of various embodiments should not be construed to limit the scope or breadth of the present invention.

A method of adjusting game parameters based on measurement of a user's performance is described. In one embodiment, statistics about typical player interaction with a game are received. These statistics can be collected, for example, during quality assurance testing performed during game development. Then, during play of the game a user's performance is monitored. For example, the user's performance can be monitored by detecting the user's interaction with a game controller during play of the game, or the user's performance moving through various levels of the game. It is then determined if the player's performance is within a desired range of performance. Game parameters are adjusted during game play if the user's performance is outside the desired range.

For example, game parameters can be adjusted to limit game options available to the user. Or, game parameters can be adjusted to enhance game options available to the user. For example, if it is determined that a player's performance is below the desired range the user can be provided enhance game options, while if the player's performance is above the desired range the game options available to the user can be limited. In addition, if a player is interacting with an artificial intelligence (AI) character in the game, the capability of the AI character can be increased or decreased in response to measurement of the player's performance in the game.

In another embodiment, game parameters are adjusted based on a player's performance in a multi-user game environment. The method includes receiving profiles of users in the multi-player game, and then adjusting game options of the respective players based upon their respective profiles. For example, if one player's profile indicates that that player is a vastly superior player to their opponent, then the superior player may be provided with limited options, or the opponent may be provided with enhanced game options, or both. The relative performance of the players is monitored during the playing of the game and it is determined if the players' relative performance is within a desired range of performance. If the relative performance of the respective players is outside the desired range then game parameters are adjusted. The game parameters may be adjusted dynamically during game play.

More specifically, various embodiments of the methods, apparatus, techniques, programs, and system described herein provide for adjustment of game parameters based on measurement of a player's performance. Embodiments described herein provide for detecting and measuring a user's gaming performance and dynamically adjusting game parameters in response to that performance. A user's performance can be evaluated in many different ways. For example, a user's hand eye coordination can be evaluated by monitoring and evaluating a user's response to audio and visual stimulation, such as the response a user provides using a game controller. For example, using a game control interface that has motion sensing capabilities, such as an accelerometer, a series of visual and/or audio stimuli may be provided to the user. A user's response time to these various stimuli can be determined using the control interface. By using a history of measurements of the player's performance, various parameters of the game may be dynamically adjusted.

Making small adjustments to the difficulty level of a game over time while a user is playing the game can help insure a pleasurable experience for users of various experience and capability levels. For example, the difficulty level of a game may be lowered when it is determined that the user is a casual or novice gamer. Likewise, the difficulty level and complexities can be increased for users who have more experience. In addition, game parameters can be adjusted based on the user's reaction time to various stimuli. For example, users who demonstrate superior hand eye or hand ear coordination may have the game parameters adjusted differently than a user who has average or below average hand eye or hand ear coordination.

In addition to modifying game parameters, the response of the controller can also be adjusted in response to the player's experience level. For example, if a player has very good hand eye or hand ear coordination, the responsiveness of the controller can be adjusted accordingly. Likewise, if the player's hand eye or hand ear coordination is low, the controller's response can be adjusted accordingly.

In one embodiment, given a control interface with motion sensing capabilities such as an accelerometer and a series of visual and/or auditory tests, it is possible to gauge the response times and the level of control of the person using the control interface. Using a history of these measurements it is possible to dynamically adjust the difficulty level of a game. By making minute adjustments to the difficulty level over time one can ensure a pleasurable experience for gamers of all levels by keeping the difficulty level low for casual gamers while also increasing complexity for those with better hand-eye or hand-ear coordination.

The usage input history from a motion sensing input device, in addition to other control inputs, can be used to determine the skill level and reflexes of the player wielding the control interface. Then, using the gauged skill level, the game difficulty can be modified during the course of a game. Typically, in conventional use, a Human Interface Device (HID) is strictly used as an input device. Using the techniques described herein, however, the HID is used to generate a profile of inputs that are used to determine a user skill level and reaction times. These metrics may then be used to adjust the game play to better suit the user.

Various techniques can be used to adjust game parameters or game difficulty. For example, game difficulty could be scaled to:

Shorten or lengthen the display duration of visual cues.
Increase or decrease the volume of auditory cues relative to the game volume.

Change the display location of visual cues to increase difficulty or use a static location to decrease difficulty.

If a player responds well to auditory cues but not visual cues, use only visual cues.

If a player responds well to visual cues but not auditory cues, use only auditory cues.

If a player response is expected within some time interval of a visual or auditory cue, a "fudge factor" could be introduced and be based on historical input data.

Enemy/Opponent AI can be scaled up or down based on the measured level of control.

Control precision requirements can be adjusted based on measured level of control.

In an embodiment, in a multi-player game environment player profiles can be evaluated so as to provide a better competitive match between players in the multi-player game. In addition, in a multi-player game environment the difficulty level or capabilities available to different players or users may be adjusted according to their respective skill level. For example, in a multi-player game a very experienced player may have the set of game options available to them limited, for example, an experienced user may have a limited set of weaponry in a fighting game or a limited selection of cars in a racing game to choose from. In this scenario a less experienced user may have the option to select more capable or different game enhancements and options than the more experienced player. In this way, the two players can engage in the game in a more competitive level thereby providing a more satisfactory experience to both of the players.

In another embodiment, where a player engages a game and his opponent is an artificial intelligence (AI) character or avatar, the performance of the AI character can be scaled in accordance with the user's experience level. For example, if the user is very experienced then the AI response can be scaled up to a higher level to increase the effectiveness of the AI opponent when engaging the experienced user. Likewise, if the user is very inexperienced, then the AI capability can be scaled down so that its response is at an appropriate level for the inexperienced user's experience level. For example, an AI character may be restricted to certain motions or movements, such as if the AI character is chasing the user in a maze game, the AI character may be limited to only turning a particular direction as they move through the maze.

As noted, the response of the game controller can be adjusted according to the user's experience level. For example, if the user is very experienced, then all inputs from the controller such as motion of the controller or tilt or turn of the controller will be recognized as valid user inputs and the game will respond to these inputs accordingly. Likewise, if the user is an inexperienced user, then some of the motions of the game controller may be ignored or reduced so as not to interfere with the user's game performance. For example, in a car racing game an experienced user may enter into a turn and rotate the controller so that the car enters into a slide to pass through the turn. Because the user is experienced, then the user's "twist" of the controller will be recognized as a valid input by the game and the car will be put into a slide in response to the input. Likewise, if an inexperienced user enters into a turn and the inexperienced user twists the controller, it may just be in a natural response to trying to "turn" the car in the game. In this case, the user's turning of the game controller can be minimized, or ignored, so that the user does not enter into a slide but instead smoothly turns through the corner.

FIG. 1 is a block diagram illustrating a system that operates in accordance with an embodiment of the present invention. As illustrated in FIG. 1, a computer, or game, entertainment console 102 may be coupled to a video display 104 such as a television or other type of visual display. A game or other simulations may be stored on a storage media 106 such as a DVD, a CD, flash memory, USB memory or other type of memory media. The storage media 106 can be inserted to the console 102 where it is read. The console can then read program instructions stored on the storage media and present a game interface to the user.

Typically, a user or player manipulates an input device such as a game controller 110 to control and interact with the video game or other simulation. The game controller 110 may include conventional controls, for example, control input devices such as joysticks, buttons and the like. In addition, the game controller 110 can include an internal sensor, for example an accelerometer, that produces signals in response to the position motion orientation or change in orientation of the game controller 110. The phrase game controller is used to describe any type of Human Input Device (HID) or other input device used to interact with a game. The phrase game console is used to describe any type of computer, computing device, or game system that can execute a game program.

During operation of the console 102 when user is playing a game, the user can use the game controller 110 to interact with the game. For example, the user may push buttons, or use a joystick on the controller 110 to interact with the game. In addition, the user can move the controller 110 in a direction such as up, down, to one side, to the other side, twisted, wedged, shaken, jerked, punched, etc. In addition to using the controller to interact with the game, use of buttons, joysticks, and movements of the controller 110, and the like, may be detected and captured in the game console 102 for analysis of the user's game performance.

In general, signals from the game controller 110 are used to generate positions and orientation data that may be used to calculate many physical aspects of the user's interaction with the game. Certain movement patterns or gestures for the controller 110 may be predefined and used as input commands for the game or other simulation. For example, a plunging downward gesture of the controller 110 may be defined as one command, a twisting gesture of the controller 110 may be defined as another command, a shaking gesture of the controller 110 may be defined as still another command, and so on. In this way the manner in which the user physically moves the controller 110 can be used as an input for controlling the game which provides more pleasurable and stimulating experience for the user.

As a user interacts with a game by using the controller, the user's performance can be monitored so as to determine a user's experience level. Likewise, as a user maneuvers through the game environment the amount of movement the user imparts to the controller can be monitored to determine the user's experience level. For example, if a user is going through an environment where very small movements of the player are desirable yet the controller is moved through large motion, it may be determined that the user is not very experienced. In this way, the amount of movement that the user imparts to the controller can be scaled so that as the user maneuvers through the environment it more closely matches the expected movement patterns.

Figure 2:
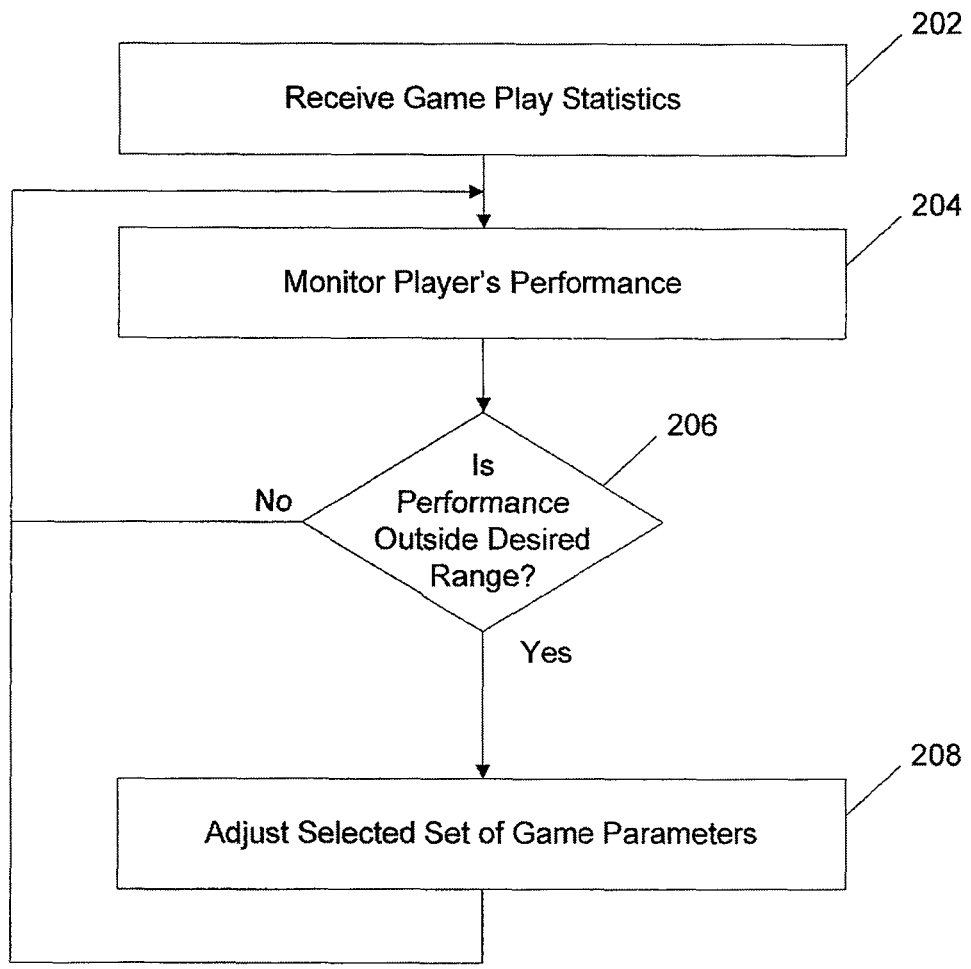
FIG. 2 is a flowchart illustrating an embodiment of dynamically adjusting game parameters in response to a user's performance level in accordance with an embodiment of the present invention.

FIG. 2 is a flowchart illustrating an embodiment of dynamically adjusting game parameters in response to a user's performance level. Flow begins in block 202 where game statistics about a particular game that is being played are received. For example, during manufacture of a game there is typically extensive quality assurance testing of the game by many users. During this quality assurance testing, statistics are gathered across the multiple users to develop profiles of how players of different skill levels respond to different game situations. Using different statistical analysis tools, things such as standard deviations can be calculated to define where a player's specific experience level compares to this norm. Flow then continues to block 204 where the player's performance is monitored. There are numerous ways to monitor the player's performance, for example, a player's performance can be evaluated by how long it takes a player to advance through a particular scene in a game or how well the players interact with the AI of the game. Another technique for monitoring player's performance is to gather information from the controller or other user input to the game.

Flow then continues to block 206 where it is determined if the player's performance is outside of a desired range of performance. In some embodiments, the desired range of performance may be obtained by using the received statistics about typical player interaction with the game. For example, the desired range of performance may be included in, provided with, derived from, and/or calculated from the received game statistics. Namely, for the current difficulty level of the game (i.e. the current settings of the game parameters), a typical range of performance may be derived or gleaned from the received game statistics. That is, the received game statistics may be consulted to ascertain the performance of users who typically play at the difficulty level provided by the current settings of the game parameters. The typical range of performance of those users may then be used in setting the desired range of performance that is used in block 206. In some embodiments, the desired range of performance may be set equal to the typical range of performance ascertained from the received game statistics, or the desired range of performance may be set to some variation of the typical range of performance ascertained from the received game statistics. While the desired range of performance may be derived from the received game statistics, it should be understood that in some embodiments the desired range of performance may be derived independently of the received game statistics or from some other source.

If the player's performance is not outside the desired range, for example, if a player is playing at a "nominal" level of play, flow continues back to 204 and the player's performance continues to be monitored. Returning to block 206, if it is determined that the player's performance is outside the desired range, flow continues to block 208. In block 208, various game parameters or input parameters can be adjusted in response to the player's performance. For example, if the player's performance is outside the desired range of performance, then certain game parameters or game options can either be provided to or denied to the player. For example, if it is determined that the player's performance is below the nominal range, then the player may be provided additional options or enhancements to improve his game play and thereby improve his enjoyment of the game. Likewise, if the player's performance is above a nominal range, certain options and enhancements may be denied the player so as to make the game more challenging and again, thereby improve the player's enjoyment of the game. In some embodiments, the various game parameters or input parameters are adjusted while the user is playing the game. Furthermore, the various game parameters or input parameters may be adjusted dynamically such as by making small adjustments over time.

Figure 3:
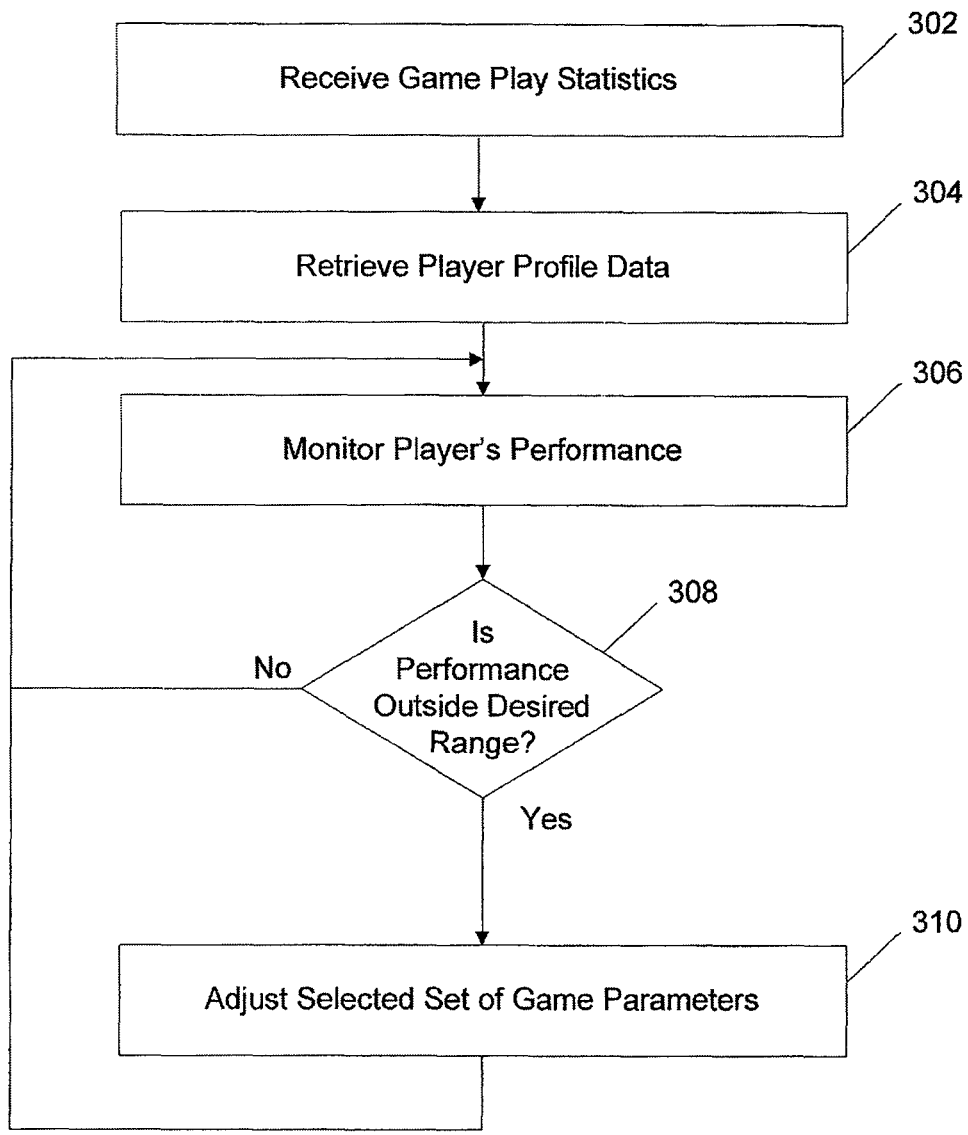
FIG. 3 is a flowchart of another embodiment of dynamically adjusting game parameters in response to a player's performance in accordance with an embodiment of the present invention.

FIG. 3 is a flowchart of another embodiment of dynamically adjusting game parameters in response to a player's performance. Flow begins in block 302 where statistics about game play are received. For example, statistics can be gathered during quality assurance testing during game development to identify a normal distribution of player performance. Flow continues to block 304. In block 304 profile data about a player is retrieved, for example, profile data can be built up over time as a player interacts with the game. For example, the profile data can be updated as the player continues to interact with the game and improves his performance and abilities. In some embodiments, the profile data may be used to set the initial difficulty level of the game. For example, an indication of the skill of the player may be ascertained from the profile data. Then, the various game parameters, settings and options of the game may be initially adjusted in an attempt to match the skill level of the player.

Flow continues to block 306. In block 306 the player's performance is monitored. Flow continues to block 308. In block 308 it is determined if a player's performance is outside a desired range of performance. Similar to as discussed above, in some embodiments, the desired range of performance may be included in, provided with, derived from, and/or calculated from the received game statistics. For example, the received game statistics may be consulted to ascertain the performance of users who typically play at the difficulty level provided by the current settings of the game parameters. As mentioned above, in some embodiments the initial settings of the game parameters may be set based on the retrieved player profile data. Again, while the desired range of performance may be derived from the received game statistics, it should be understood that in some embodiments the desired range of performance may be derived independently of the received game statistics or from some other source.

If the player's performance falls within the desired range, there is a negative outcome from block 308. Flow continues to block 306 and the player's performance continues to be monitored. Returning to block 308, if the player's performance is outside the desired range, there is an affirmative outcome from block 308. Flow continues to block 310. In block 310 various game parameters and enhancements or options are adjusted in response to the player's performance. For example, if the player's performance is below the desired range, the player may be provided additional options and/or enhancements to increase his performance. Likewise, if the performance from the player is above the desired range, certain enhancements and options of the game may be denied the player so as to bring the player's performance within the desired range. In some embodiments, the various game parameters and enhancements or options are adjusted while the user is playing the game. Furthermore, the adjustments may be made dynamically such as by making small adjustments over time. From block 310 flow continues to block 306 and the player's performance continues to be monitored.

Figure 4:
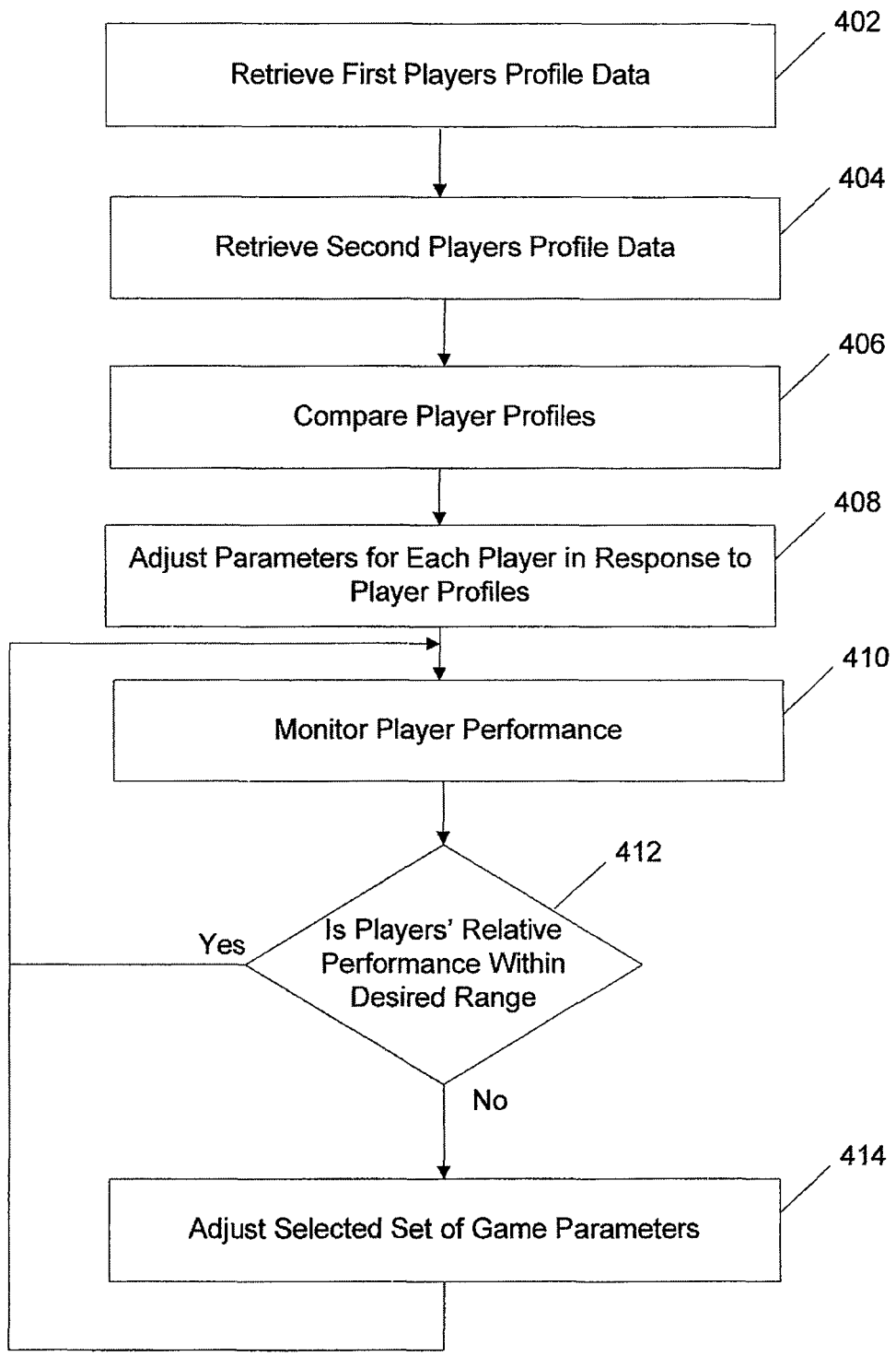
FIG. 4 is a flowchart illustrating an embodiment of a multi-player game environment where user's performance is used to dynamically adjust game parameters in accordance with an embodiment of the present invention.

FIG. 4 is a flowchart illustrating an embodiment of a multi-player game environment where a user's performance is used to dynamically adjust game parameters. Flow begins in block 402 where a first player's profile data is retrieved. Flow continues to block 404 where a second player's profile data is retrieved. Flow continues to block 406 where the profiles of the two players are compared. In one embodiment, the two players' performance can be compared to identify specific aspects of a player's profile.

Flow then continues to block 408. In block 408 various parameters and options of the game are adjusted for each player in response to their profile and the comparison of their profile to the other player. For example, if one player responds much more quickly to audio keys than the other player, then the number of audio keys may be reduced so as to equalize play between the two players or the audio keys to one player may be degraded. In one embodiment, the player who responds well to audio keys may hear muted or distorted audio keys while the other player hears normal audio keys.

After adjustment of their game parameters and options, flow continues to block 410. In block 410 each player's performance is monitored.

Flow continues to block 412 where it is determined if the players' relative performance is within a desired range. Similar to as discussed above, in some embodiments, the desired range of the players' relative performance may be obtained by using the received game statistics. For example, the desired range of the players' relative performance may be included in, provided with, derived from, and/or calculated from the received game statistics. Namely, the received game statistics may be consulted to ascertain the relative performance of users playing in the multi-player game. For example, if one player is very skilled in comparison to the other player, then game parameters can be adjusted so that the two players' relative performance is more closely matched. However, the skill level of the two players does not need to be matched identically. In other words, a superior player may still be able to win the game over an inferior player although it may be more difficult for the superior player to be able to accomplish that. If in block 412 it is determined that the relative performance is within the desired range, flow continues to block 410 and the players' relative performance to each other continues to be monitored. If in block 412 it is determined that the players' relative performance is not within the desired range, flow continues to block 414 where various game parameters and options and enhancements are adjusted so as to bring the players' relative performance within the desired range. The various game parameters and options and enhancements may be adjusted differently for each of the players to make the overall game play more competitive. Similar to above, in some embodiments, the various game parameters and enhancements or options are adjusted while the users are playing the game and may be adjusted dynamically such as by making small adjustments over time. Flow continues back to 410 and the players' performance continues to be monitored.

Figure 5:
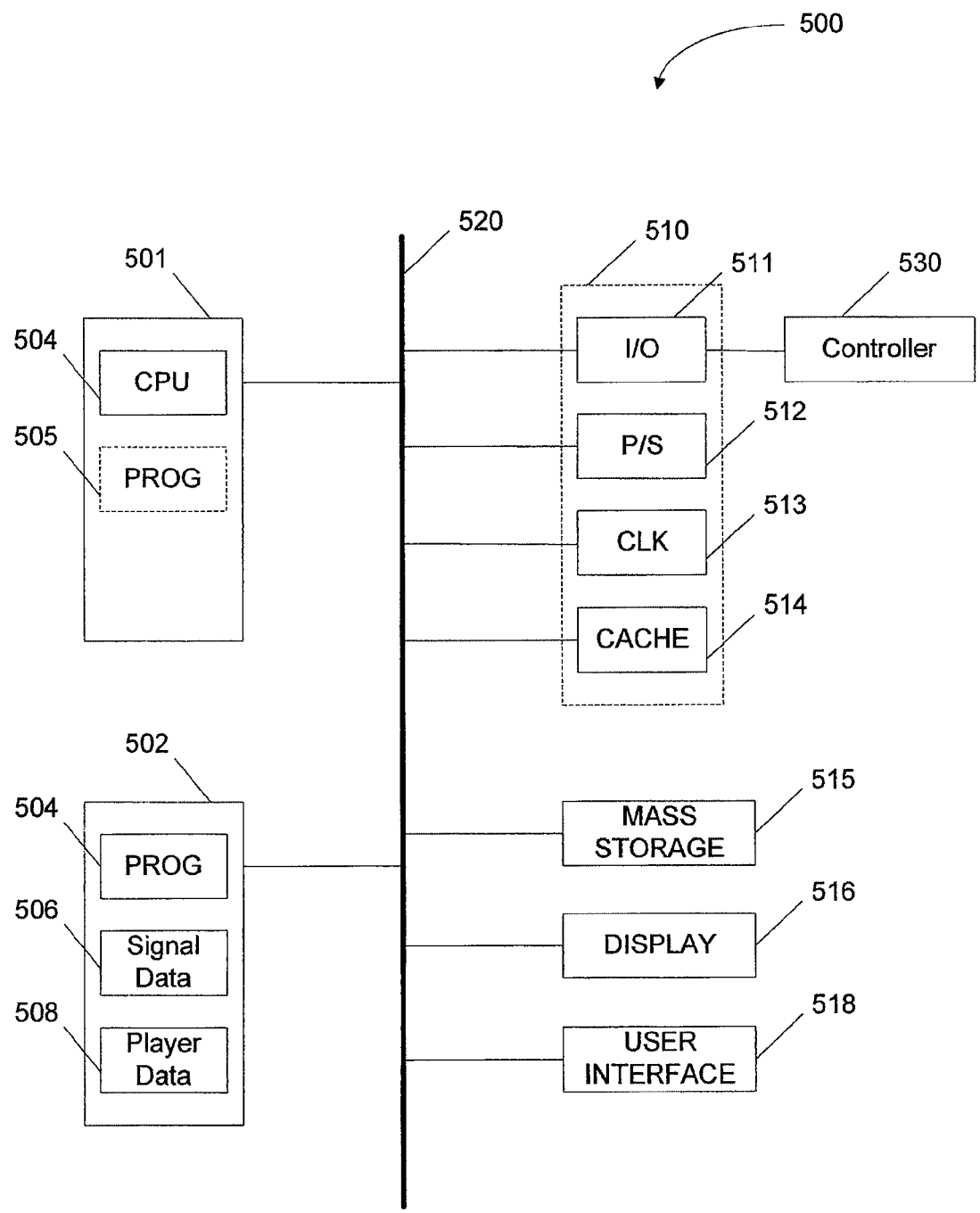
FIG. 5 is a block diagram of a gaming system 500 that may be used to implement various embodiments described herein.

FIG. 5 is a block diagram of a gaming system 500 that may be used to implement various embodiments described herein. The gaming system 500 is an example of a processor based system. As shown in FIG. 5, the gaming system 500 may include a processor module 501 and a memory module 502. In one embodiment, memory module 502 may be RAM, DRAM, ROM and the like. In addition, the gaming system 500 may have multiple processor modules 501 if parallel processing is to be implemented. The processor module 501 can include a central processing unit 503. In addition, the processor module 501 can include local storage or a cache to store executable programs. The memory module 502 can include game program storage 505. In addition, the memory module 502 can include signal data storage 506, for example, signal data acquired from game controller operated by a user. The memory module 502 can also include player data 508 such as player profile data as well as game statistics that may be provided. The system 500 may also include well-known support function module 510 such as input/output elements 511, power supplies 512, a clock 513, in cache memory 514. The system 500 may also optionally include mass storage module 515 such as a disc drive, CD ROM drive, DVD drive, tape drive or the like to store programs and/or data. The system 500 may also optionally include a display module 516 as well as a user interface module 518 to facilitate interaction between the system 500 and the user. Display module 516 may be in the form of a cathode ray tube, a flat panel screen or any other display module. The user interface module 518 may include a keyboard, mouse, joystick, write pen or other device such as a microphone, video camera or other user input device. The processor, memory, and other components within the system 500 may exchange signals such as code instructions and data with each other via a system bus 520.

Various embodiments described may be implemented primarily in hardware, or software, or a combination of hardware and software. For example, a hardware implementation may include using, for example, components such as application specific integrated circuits ("ASICs"), or field programmable gate arrays ("FPGAs"). Implementation of a hardware state machine capable of performing the functions described herein will also be apparent to those skilled in the relevant art.

The term "module" as used herein means, but is not limited to a software or hardware component, such as an FPGA or an ASIC, which performs certain tasks. A module may advantageously be configured to reside on an addressable storage medium and configured to execute on one or more network enabled devices or processors. Thus, a module may include, by way of example, components, processes, functions, attributes, procedures, subroutines, segments of program code, drivers, firmware, microcode, circuitry, data, databases, data structures, tables, arrays, variables, and the like. The functionality provided for in the components and modules may be combined into fewer components and modules or further separated into additional components and modules. Additionally, the components and modules may advantageously be implemented to execute on one or more network enabled devices or computers.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

By way of example, in some embodiments a storage medium may store a computer program executable by a processor based system. The computer program may be configured to cause the processor based system to execute steps comprising any of the methods and/or techniques described herein.

As mentioned above, in some embodiments the game controller or other input device may comprise a motion sensing controller or other motion sensing input device. In some embodiments, such motion sensing controller may comprise a hand-held controller that has the ability to have its three-dimensional movements tracked. Such tracking may be performed in many different ways. For example, such tracking may be performed through inertial, video, acoustical, or infrared analysis. Such motion sensing capabilities may also be implemented with an accelerometer or the like. As another example, such motion sensing capabilities may be implemented in some embodiments with a so-called "six-axis controller" or the like.

By way of example, in some embodiments the motion sensing controller may comprise any of the types of controllers described in U.S. patent application Ser. No. 11/382,034, filed on May 6, 2006, entitled "SCHEME FOR DETECTING AND TRACKING USER MANIPULATION OF A GAME CONTROLLER BODY", U.S. patent application Ser. No. 11/382,037, filed on May 6, 2006, entitled "SCHEME FOR TRANSLATING MOVEMENTS OF A HAND-HELD CONTROLLER INTO INPUTS FOR A SYSTEM", U.S. patent application Ser. No. 11/382,043, filed on May 7, 2006, entitled "DETECTABLE AND TRACKABLE HAND-HELD CONTROLLER", U.S. patent application Ser. No. 11/382,039, filed on May 7, 2006, entitled "METHOD FOR MAPPING MOVEMENTS OF A HAND-HELD CONTROLLER TO GAME COMMANDS", U.S. patent application Ser. No. 11/382,259, filed on May 8, 2006, entitled "METHOD AND APPARATUS FOR USE IN DETERMINING LACK OF USER ACTIVITY IN RELATION TO A SYSTEM", U.S. patent application Ser. No. 11/382,258, filed on May 8, 2006, entitled "METHOD AND APPARATUS FOR USE IN DETERMINING AN ACTIVITY LEVEL OF A USER IN RELATION TO A SYSTEM", U.S. patent application Ser. No. 11/382,251, filed on May 8, 2006, entitled "HAND-HELD CONTROLLER HAVING DETECTABLE ELEMENTS FOR TRACKING PURPOSES," U.S. patent application Ser. No. 11/536,559, filed Sep. 28, 2006, entitled "MAPPING MOVEMENTS OF A HAND-HELD CONTROLLER TO THE TWO-DIMENSIONAL IMAGE PLANE OF A DISPLAY SCREEN," U.S. patent application Ser. No. 11/551,197, filed Oct. 19, 2006, entitled "CONTROLLER CONFIGURED TO TRACK USER'S LEVEL OF ANXIETY AND OTHER MENTAL AND PHYSICAL ATTRIBUTES," and U.S. patent application Ser. No. 11/551,682, filed Oct. 20, 2006, entitled "GAME CONTROL USING THREE-DIMENSIONAL MOTIONS OF CONTROLLER," the entire disclosures of which are all hereby incorporated herein by reference in there entireties.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. Thus, the invention is not intended to be limited to the embodiment shown herein but is to be accorded the widest scope consistent with the principal and novel features disclosed herein.

What is claimed is:

1. A method of adjusting game parameters in a multi-user game, the method comprising:
   receiving profiles of two or more users in the multi-user game from at least one control interface used by the users to interact with the multi-user game;
   adjusting game options for the respective users based upon their respective profiles;
   monitoring the users' relative performance in playing the multi-user game while the users are playing the multi-user game, wherein monitoring the users' relative performance comprises monitoring movements of a motion sensing input device being manipulated by each user;
   determining if the users' relative performance while the users are playing the multi-user game is within a desired range of performance; and
   dynamically adjusting game parameters for one or more of the users while the users are playing the multi-user game if the relative performance of the users is outside the desired range.

2. The method of claim 1, wherein dynamically adjusting game parameters comprises limiting game options available to one of the users.

3. The method of claim 1, wherein dynamically adjusting game parameters comprises enhancing game options available to one of the users.

4. The method of claim 1, further comprising:
   receiving statistics about typical player interaction with the multi-user game; and
   obtaining the desired range of performance by using the received statistics.

5. A method of adjusting game parameters in a multi-user game, the method comprising:
   receiving profiles of two or more users in the multi-user game from at least one control interface used by the users to interact with the multi-user game;
   adjusting game options for the respective users based upon their respective profiles;
   monitoring the users' relative performance in playing the multi-user game while the users are playing the multi-user game, wherein monitoring the users' relative performance comprises detecting the respective user's reaction to audio stimuli;
   determining if the users' relative performance while the users are playing the multi-user game is within a desired range of performance; and
   dynamically adjusting game parameters for one or more of the users while the users are playing the multi-user game if the relative performance of the users is outside the desired range.

6. A method of adjusting game parameters in a multi-user game, the method comprising:
   receiving profiles of two or more users in the multi-user game from at least one control interface used by the users to interact with the multi-user game;
   adjusting game options for the respective users based upon their respective profiles;

monitoring the users' relative performance in playing the multi-user game while the users are playing the multi-user game, wherein monitoring the user's relative performance comprises detecting the respective user's reaction to visual stimuli;

determining if the users' relative performance while the users are playing the multi-user game is within a desired range of performance; and dynamically adjusting game parameters for one or more of the users while the users are playing the multi-user game if the relative performance of the users is outside the desired range.

7. A non-transitory storage medium storing a computer program executable by a processor based system, the computer program causing the processor based system to execute steps comprising:

receiving profiles of two or more users in a multi-user game;

adjusting game options for the respective users based upon their respective profiles;

monitoring the users' relative performance in playing the multi-user game while the users are playing the game, wherein monitoring the users' relative performance comprises monitoring movements of a motion sensing input device being manipulated by each user;

determining if the users' relative performance is within a desired range of performance while the users are playing the game; and dynamically adjusting game parameters for one or more of the users while the users are playing the multi-user game if the relative performance of the users is outside the desired range.

8. The storage medium of claim 7, further comprising:

receiving statistics about typical player interaction with the multi-user game; and obtaining the desired range of performance by using the received statistics.

9. A non-transitory storage medium storing a computer program executable by a processor based system, the computer program causing the processor based system to execute steps comprising:

receiving profiles of two or more users in a multi-user game;

adjusting game options for the respective users based upon their respective profiles;

monitoring the users' relative performance in playing the multi-user game while the users are playing the game, wherein monitoring the users' relative performance comprises monitoring three-dimensional movements of the motion sensing input device being manipulated by each user;

determining if the users' relative performance is within a desired range of performance while the users are playing the game, wherein determining if the users' relative performance is within a desired range of performance comprises determining, by a processor based apparatus and from the monitored three-dimensional movements of the motion sensing input device, if the users' relative performance is within the desired range of performance while the users are playing the game; and dynamically adjusting game parameters for one or more of the users while the users are playing the multi-user game if the relative performance of the users is outside the desired range.

10. A method of adjusting game parameters in a multi-user game, the method comprising:

receiving profiles of two or more users in the multi-user game from at least one control interface used by the users to interact with the multi-user game;

adjusting game options for the respective users based upon their respective profiles;

monitoring the users' relative performance in playing the multi-user game while the users are playing the multi-user game, wherein monitoring the users' relative performance comprises monitoring movements of a motion sensing input device being manipulated by each user and wherein the motion sensing input device used by each user is the at least one control interface used by the users to interact with the multi-user game and monitoring the users' relative performance comprises monitoring three-dimensional movements of the motion sensing input device; and determining if the users' relative performance while the users are playing the multi-user game is within a desired range of performance, wherein determining if the users' relative performance is within a desired range of performance comprises determining, by a processor based apparatus and from the monitored three-dimensional movements of the motion sensing input device, if the user's relative performance is within a desired range of performance while the users are playing the multi-user game; and dynamically adjusting game parameters for one or more of the users while the users are playing the multi-user game if the relative performance of the users is outside the desired range.

* * * * *